O. W. DODGE.
SHAFT COLLAR.
APPLICATION FILED OCT. 5, 1912. RENEWED MAR. 27, 1916.
1,201,706.
Patented Oct. 17, 1916.
2 SHEETS—SHEET 1.
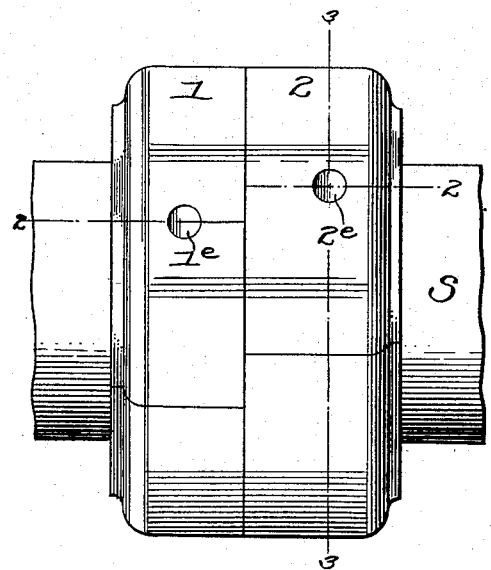
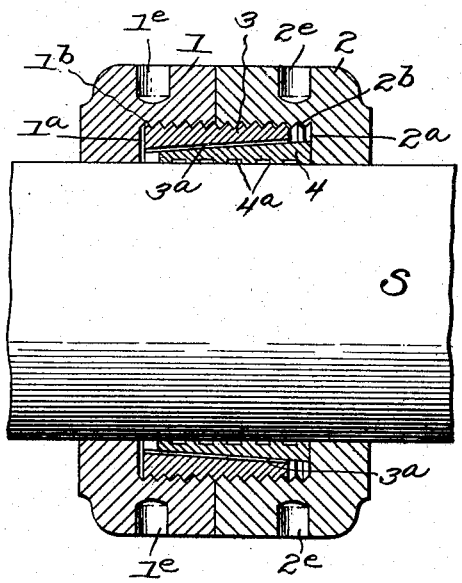
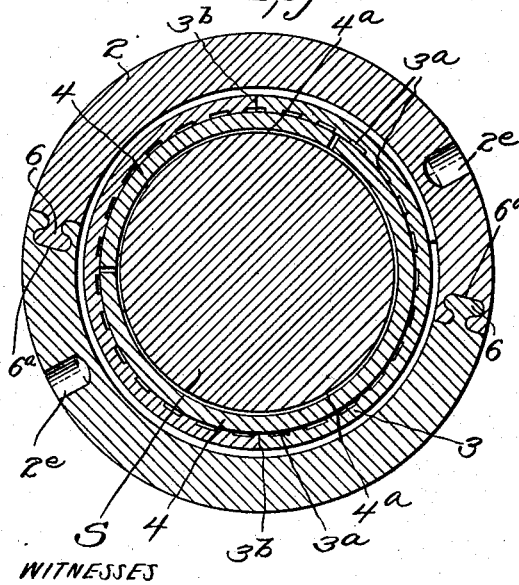
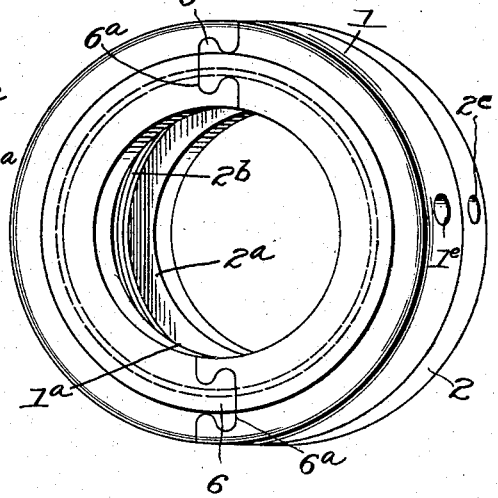
WITNESSES
INVENTOR
Otis W. Dodge.
By Alexander Sowell
Attorneys O. W. DODGE.
SHAFT COLLAR.
APPLICATION FILED OCT. 5, 1912. RENEWED MAR. 27, 1916.
1,201,706.
Patented Oct. 17, 1916.
2 SHEETS—SHEET 2.
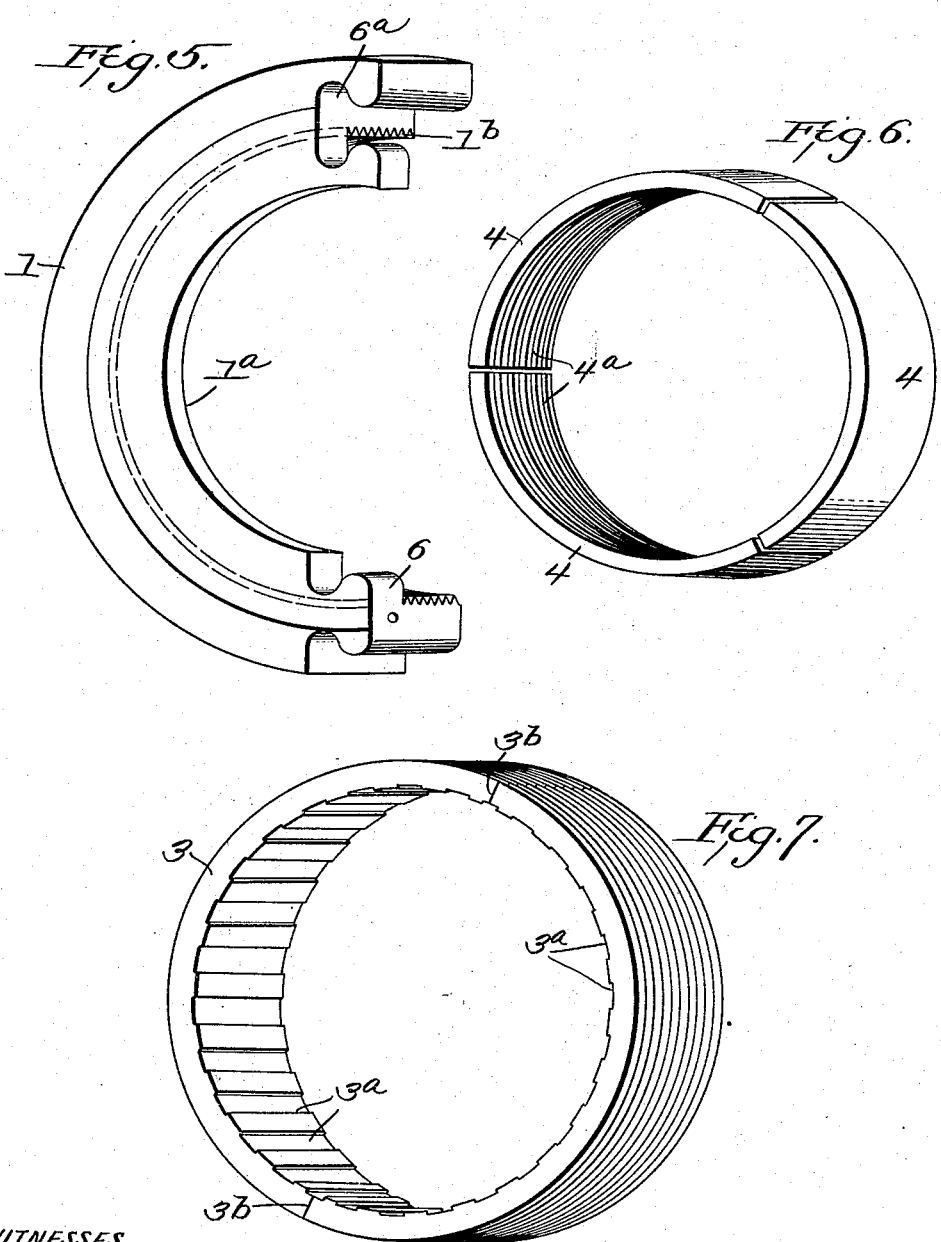

UNITED STATES PATENT OFFICE.

OTIS WILLIAM DODGE, OF SPOKANE, WASHINGTON.

SHAFT-COLLAR.

1,201,706.  Specification of Letters Patent.  Patented Oct. 17, 1916.

Application filed October 5, 1912, Serial No. 724,215. Renewed March 27, 1916. Serial No. 87,129.

*To all whom it may concern:*

Be it known that I, OTIS W. DODGE, of Spokane, in the county of Spokane and State of Washington, have invented certain new and useful Improvements in Shaft-Collars; and I hereby declare that the following is a full, clear, and exact description thereof, reference being had to the accompanying drawings, which form part of this specification.

This invention is a novel safety-collar for use upon shafting, or wherever it may be desired to apply a collar to a shaft, or rod. Its principal object is to provide a collar which can be adjusted on the shaft and can be fastened securely to the shaft, when adjusted, without the necessity of keying or bolting it to the shaft.

Another object is to provide a safety collar which can be made either with solid annular parts or with sectional annular parts; the parts being sometimes made in sections to facilitate the application of the collar to a shaft *in situ* without disturbing the bearings of such shaft.

A further object is to provide a safety collar which will have no dangerous projecting portions, or bolts or screws which might loosen and project and thus constitute a source of danger to operatives or persons near the collar, if used on a rotating shaft.

The uses of such collars are many in the arts, and the invention is not restricted to any particular application thereof.

The invention is illustrated in the accompanying drawings and will be described in detail with reference thereto; and the claims summarize the novel features of construction and combination of parts in the collar for which protection is desired.

In the drawings—Figure 1 is a side view of the safety collar in position on a shaft. Fig. 2 is a longitudinal section on line 2—2, Fig. 1. Fig. 3 is a transverse section on line 3—3, Fig. 1. Fig. 4 is a perspective view of one of the collar members detached and showing how it may be made in sections. Fig. 5 is a perspective view of one of the sections of the collar member shown in Fig. 4 detached. Fig. 6 is a view of the inner clamping sections. Fig. 7 is a view of the outer clamping member.

The collar comprises two similar annular sections or members 1 and 2 which members may be of the same or of unequal width (axially of the collar); preferably I make member 2 slightly wider than the member 1. These members when abutted together upon a shaft, form a collar of the desired width and diameter. These members will vary in internal diameter according to the exterior diameter of the shaft S to which they are to be applied; and externally the members will vary in external diameter or size according to the projection which it is desired the collar shall have from the shaft.

The members are preferably recessed interiorly as at $1^a$, $2^a$, so as to form an annular chamber around the shaft within the collar when the members are together thereon. Each member of the collar is interiorly threaded as shown at $1^b$, $2^b$; their threads being of similar pitch. Within the collar chamber and around the shaft is an annular clamping member 3 which is exteriorly threaded to engage the threads of the members 1 and 2, and is interiorly tapered, (longitudinally of the axis of the collar) and is of greater diameter than the shaft to which the collar is to be secured.

Interposed between the clamping member 3 and the shaft S, and within the collar chamber, is an annular series of clamping segments 4, which are tapered externally conformably with, but oppositely to, the internal taper of the clamping member 3; and each clamping segment is preferably grooved circumferentially on its inner face as at $4^a$. Said clamp segments are curved on arcs corresponding to the circumference of the shaft S so that when the segments are placed in the chamber around the shaft they will fit close to the shaft and almost but not quite abut against each other. Preferably the inner face of the clamping member 3 is longitudinally grooved, (axially of the shaft) as at $3^a$, so as to reduce frictional contact between the clamping segments and the clamping member. I do not however consider this grooving essential.

When the collar is to be applied to a rod or shaft that is easily accessible and on which the collar may be slipped endwise; the members 1 and 2 and clamping member 3 may be solid annular bands or rings; but in order to facilitate the application of the safety collar to a shaft or rod in a position where the collar could not be slipped endwise thereon and where it would be very inconvenient and troublesome to take down the shaft, the collar members 1 and 2 may each be made of two diametrically opposite similar semi-circular parts, see Figs. 4 and 5, each part having a dove-tailed lug 6 on one end and a transverse dove-tailed slot 6ª on its other end; and when two such parts are brought together the dove-tailed lug 6 on the end of one part can be slid endwise into the dove-tailed slot 6ª on the end of the other part; and the dove-tailed lug 6 on the latter part similarly engaged with the dove-tailed slot 6ª of the first part, as indicated in Fig. 4. In this way a complete substantially solid annular collar member is formed the parts thereof being securely held together against relative radial movement in any direction by the interlocking lugs and slots; and this connection does not require bolts or pins to lock the parts together; and as the parts have corresponding interior threads, when the parts are connected to form an annular collar member and are engaged with the clamping member 3, as in Fig. 1; these parts are held against any axial displacement; and thus the collar member becomes practically as solid as if it was an integral whole. The clamping member 3 may also be made in two similar semi-circular parts by dividing it at diametrically opposite points, as indicated at the lines 3ᵇ in Fig. 7. This sectional construction of the members 1, 2 and 3 enables the collar to be readily placed upon a shaft at any point desired.

In order to secure the safety collar upon a shaft, one of the members, say 2, is first placed upon the shaft, by slipping it endwise thereon if the member be solid; or by placing the opposite parts of member 2 against opposite sides of the shaft and then sliding the parts longitudinally of the shaft until their lugs and slots interlock. Then the set of clamping segments 4 may be placed around the shaft within the chamber of the member 2; the thicker ends of the clamp segments 4 should be inserted first into the chamber in member 2. Then the thin end of the clamping member 3 is slipped over the thin ends of the clamping segments 4 and engaged with the threads of member 2. The clamping member 3 is slipped endwise onto and over the shaft if solid; or the parts of member 3 may be assembled together by placing them around the shaft, if it is made in sections. Then the member 2 is turned so as to screw it onto the clamping member 3, thereby causing said clamping member to press the clamping segments firmly and closely to the shaft and binding the segments, clamping member, and collar member firmly together around the shaft by reason of the wedging action between the tapered portion of the clamping member 3 and the clamping segments 4 and the wedging action of the threads. It is obvious that very great frictional clamping pressure can be produced between the collar and the shaft by this construction whereby the collar is securely held in position on the shaft against both endwise and rotary movement. Then the other member 1 of the collar is placed on or around the shaft (like member 2) and screwed onto the end of the clamping member 3 which projects more or less beyond the member 2; and member 1 is screwed up tightly against member 2 and abuts closely thereagainst thereby forming a complete sectional collar upon the shaft; such collar being locked securely to the shaft by the wedging action of the members 3 and 4.

Care should be taken in putting the collar on the shaft to see that it is placed thereon so that the direction of rotation of the shaft would tend to tighten the threaded connections between the clamping member and the collar member if the collar should be held.

The collar sections 1 and 2 may be provided with shallow sockets or holes 1ᵉ, 2ᵉ, for the engagement of the tooth of a spanner wrench, by which they can be forcibly turned to engage or disengage with member 3.

The safety collar can be readily applied as described, to any shaft, and can be adjusted to any desired position thereon; and when applied will be firmly and securely held against both rotary and longitudinal movement on the shaft, and may be used for taking up end thrust on the shaft; for holding and securing parts to the shaft; and for many other purposes in the arts.

I do not wish to limit myself simply to the use of the device as a collar as it obviously might be used for or as the hub of a pulley or gear if the members 3 were made of proper thickness and their peripheries finished according to the use for which they are intended; therefor while I have described the invention as a safety collar, and refer to it as a collar in the claims, I would have it understood that the invention is not limited to its use merely as a collar.

What I claim is:

1. In a safety collar the combination of similar internally recessed and threaded collar members adapted to surround a shaft, an externally threaded and interiorly tapered clamping member adapted to surround the shaft within the recess of the collar members; and clamping segments adapted to fit upon and around the shaft within the clamping member and having exteriorly tapered surfaces adapted to engage the interiorly tapered surface of the clamping member, said clamping member and clamping segments being forcibly telescoped longitudinally of the shaft by and between the collar members, substantially as described.

2. In combination a collar member composed of two opposite similar parts each formed of two sections having interlocking tongues and grooves on their meeting ends adapted to prevent radial separation thereof; said parts being interiorly threaded; with an annular longitudinally divided clamping member externally threaded to engage said collar member and tapered on its inner face, and longitudinally divided clamping segments tapered on their outer faces and interposed between the clamping member and the shaft, said clamping member and clamping segments being forcibly telescoped longitudinally of the shaft by and between the parts of the collar member, substantially as described.

3. In combination an internally threaded collar member adapted to surround a shaft, an externally threaded and interiorly tapered clamping member adapted to surround the shaft and engage said collar member, said clamping member having internal longitudinal grooves or channels in its inner face, and clamping segments adapted to fit upon and around the shaft and having exteriorly tapered surfaces adapted to engage the interiorly tapered surface of the clamping member, said segments having circumferential grooves or channels in their inner faces whereby when the collar member is screwed onto the clamping member the latter binds the clamping segments firmly to the shaft and secures the collar in position thereon.

4. In a safety collar the combination of similar internally recessed and threaded collar members adapted to surround a shaft, each collar member being composed of two similar parts having interlocking lugs and slots on their meeting ends to permit such collar member to be applied to a shaft *in situ;* an externally threaded and interiorly tapered clamping member also made in longitudinally separated parts and surrounding the shaft within and engaging said collar members, and longitudinally separated clamping segments adapted to fit upon and around the shaft within the clamping member and having exteriorly tapered surfaces adapted to engage the interiorly tapered surface of the clamping member, whereby when the opposite collar members are screwed onto the clamping member, the latter telescopes with the clamping segments and firmly secures the collar in position on the shaft, substantially as described.

5. In combination, an internally threaded collar member composed of opposite similar parts adapted to surround a shaft, an externally threaded and interiorly tapered clamping member adapted to surround the shaft within and engage with said collar member, said clamping member having internal longitudinal grooves or channels in its inner face, and clamping segments adapted to fit upon and around the shaft within the clamping member and having exteriorly tapered surfaces adapted to engage the interiorly tapered surface of the clamping member; said segments also having circumferential grooves or channels in their inner faces whereby when the collar member is screwed onto the clamping member, the latter binds the clamping segments firmly to the shaft and secures the collar in position thereon.

6. In a safety collar the combination of similar opposite internally threaded collar members adapted to surround a shaft; an externally threaded and interiorly tapered clamping member adapted to surround the shaft within and to engage said collar members, said clamping member having internal longitudinal grooves or channels in its inner face; and clamping segments adapted to fit upon and around the shaft within the clamping member and having exteriorly tapered surfaces adapted to engage the interiorly tapered surface of the clamping member, said segments also having circumferential grooves or channels in their inner faces whereby when the collar member is screwed onto the clamping member, the latter binds the clamping segments firmly to the shaft and secures the collar in position thereon, substantially as described.

In testimony that I claim the foregoing as my own, I affix my signature in presence of two witnesses.

OTIS WILLIAM DODGE.

Witnesses:
　JAMES R. MANSFIELD,
　ARTHUR E. DOWELL.

Copies of this patent may be obtained for five cents each, by addressing the "Commissioner of Patents, Washington, D. C."